United States Patent [19]

Yamamoto et al.

[11] Patent Number: 4,903,647
[45] Date of Patent: Feb. 27, 1990

[54] EXHAUST TIMING CONTROL APPARATUS

[75] Inventors: Hitoshi Yamamoto; Kouji Okazaki; Kanau Iwashita, all of Saitama, Japan

[73] Assignee: Honda Giken Kogyo Kabushiki Kaisha, Tokyo, Japan

[21] Appl. No.: 85,672

[22] Filed: Aug. 13, 1987

Related U.S. Application Data

[63] Continuation of Ser. No. 52,131, May 18, 1987, Pat. No. 4,768,473, which is a continuation-in-part of Ser. No. 888,772, Jul. 22, 1986, abandoned.

[30] Foreign Application Priority Data

Jul. 22, 1985 [JP] Japan .................................. 60-161477
Aug. 7, 1985 [JP] Japan .................................. 60-121026
Feb. 14, 1986 [JP] Japan .................................. 61-30348

[51] Int. Cl.[4] .......................................... F02D 39/04
[52] U.S. Cl. .................... 123/65 PE; 123/323
[58] Field of Search ............. 123/65 PE, 65 A, 65 V, 123/65 P, 323, 188 R, 188 B

[56] References Cited

U.S. PATENT DOCUMENTS

| | | | |
|---|---|---|---|
| 4,121,552 | 10/1978 | Mithuo | 123/65 PE |
| 4,202,297 | 5/1980 | Oku | 123/65 PE |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,388,894 | 6/1983 | Tanaka | 123/65 PE |
| 4,391,234 | 7/1983 | Holzleitner | 123/65 V |
| 4,399,788 | 8/1983 | Bostelmann | 123/323 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |

FOREIGN PATENT DOCUMENTS

| | | |
|---|---|---|
| 60112169 | 1/1987 | Japan . |
| 60161477 | 1/1987 | Japan . |
| 60121026 | 2/1987 | Japan . |
| 60200779 | 3/1987 | Japan . |
| 61-18381 | 7/1987 | Japan . |

Primary Examiner—David A. Okonsky
Attorney, Agent, or Firm—Lyon & Lyon

[57] ABSTRACT

An exhaust timing control system for two-cycle engines includes a pivotally mounted valve body on which the timing control surface is formed on a ridge-defining element positioned at the free end of a plate having reduced thickness for weight reduction purposes. The valve body is protected against thermal stresses by reception in a recess of conforming shape located in the upper surface of the exhaust passage. The component parts of the system may be provided with various structural configurations to enhance the system's operational efficiency.

10 Claims, 23 Drawing Sheets

EXHAUST TIMING CONTROL APPARATUS

BACKGROUND OF THE INVENTION

This is a continuation of U.S. patent application Ser. No. 052,131, filed May 18, 1987, now U.S. Pat. No. 4,768,473, which in turn is a continuation-in-part of U.S. patent application Ser. No. 887,772, filed July 22, 1986 (now abandoned).

The of the present invention is timing mechanisms for the exhaust ports of two-cycle engines.

Two-cycle engines typically employ the upper edge of a piston as the means for timing the opening and closing of the exhaust ports. In such engines, the exhaust passage may be tuned such that a reflected wave of pressure initiated by the opening of the exhaust ports can force unburned air fuel mixture, trailing the exhaust gases through the exhaust passage, back into the cylinder just prior to closure of the exhaust porting. This tuning of the exhaust is specifically effective at a limited range of engines speed. Often power can drop off remarkably when the engine speed does not fall within the tuned range.

To broaden the effective power range for two-cycle engines, exhaust timing control devices have been employed which provide an apparent upper timing edge to the exhaust porting that may be moved upwardly or downwardly depending on engine speed. In this way, power can be realized across a broader range of engine speeds. As the timing for both the opening and closing of the exhaust porting is changed through movement of a valve mechanism, the timing can better employ a pressure wave in the exhaust passage.

The speed at which two-cycle engines operate and the harsh environment of the exhaust of such engines have resulted in substantial design problems in devising such exhaust timing control devices. The devices must respond quickly to changes in engines speed, they must be capable of withstanding a wide temperature range from cold engine starts to continuous high power operating conditions and they must continue to operate in an environment having a tendency to accumulate deposits of carbon in areas not subjected to direct high temperature exhaust flow.

The foregoing environment requires mechanisms which will not quickly erode under the impingement of high temperature exhaust flow and yet be sufficiently light to respond quickly to changing engine speeds. The harsh environment also requires high heat transfer at thin walled sections, avoidance of direct impingement on such sections and the avoidance where possible of thin walled sections themselves. In addition, the harsh environment encountered by such timing control devices is enhanced by sealing mechanisms which prevent exhaust flow from depositing carbon in areas where the relative movement of parts would be inhibited by carbon build-up.

One prior device employed for exhaust timing control is disclosed in Japanese Utility Model Publication No. 36047/1972. In this device, the thin components exposed to high temperature exhaust gas can be adversely affected. A problem with increasing the size, and correspondingly the weight, of such components to overcome the thermal loads is that the devices become too heavy to respond properly to rapid changes in engine speed without correspondingly larger components employed for driving the valve. This can in turn reduce the effectiveness of the exhaust passage as well.

In systems where more substantial components may be arranged to avoid such problems with heat, by being located in recesses of the exhaust passage for example, problems can then develop in the creation of thin wall sections in the cylinder, principally around the exhaust port where such recesses approach the cylinder wall. Where thin walled areas exist, heat is less able to be conducted away to cooling devices on the engine. Such systems employing recesses and the like also can have areas where carbon build-up is detrimental to the operation of the system. However, sealing of such areas is difficult because of the high temperature environment and because of the need for clearances to accommodate thermal expansion and contraction of the components. Thus, substantial design considerations are required in the construction of such exhaust timing control devices.

SUMMARY OF THE INVENTION

The present invention is directed to apparatus for defining a variable, apparent upper timing edge on the exhaust ports of two cycled engines. The apparatus contemplates light weight construction, the minimizing of areas of high thermal stress and the inhibition of carbon build-up in critical areas.

According to an aspect of the present invention, a valve body is contemplated which employs a plate having a substantial portion of reduced thickness in addition to an upwardly extending portion adjacent the control surface. This structure accommodates thermal stress and is light weight to reduce inertial loads.

The valve body may be configured such that the edge portions of the exhaust port in the cylinder block are imparted with sufficient heat transfer capability through increased wall thickness to accommodate the high temperature exhaust flow thereby. To this end, the valve body may be tapered to provide clearance for additional wall thickness of the cylinder block at the exhaust ports. The valve body may also be configured to aid in sealing the components, particularly approaching the corners of the exhaust porting by means of a downwardly curving valve body.

In another aspect of the present invention, sealing between the exhaust passage and the valve body located therein for accomplishing the exhaust timing control are arranged with overlapping sections to create simple labyrinth seals to avoid the injurious flow of exhaust gases to areas between the valve body and the most adjacent wall portions of the cylinder block.

The valve body can, further, be advantageously configured so as to prevent the accumulation of harmful carbon deposits and the arrangement can be organized to permit the use of exhaust ports of extended flow area without interfering with the cylinder's scavanging ports or with the slidability of the piston rings.

Accordingly, it is an object of the present invention to provide an improved exhaust timing control apparatus for two-cycle engines. Other and further objects and advantages will appear hereinafter.

DETAILED DESCRIPTION OF THE PREFERRED EMBODIMENT

Figure 2:
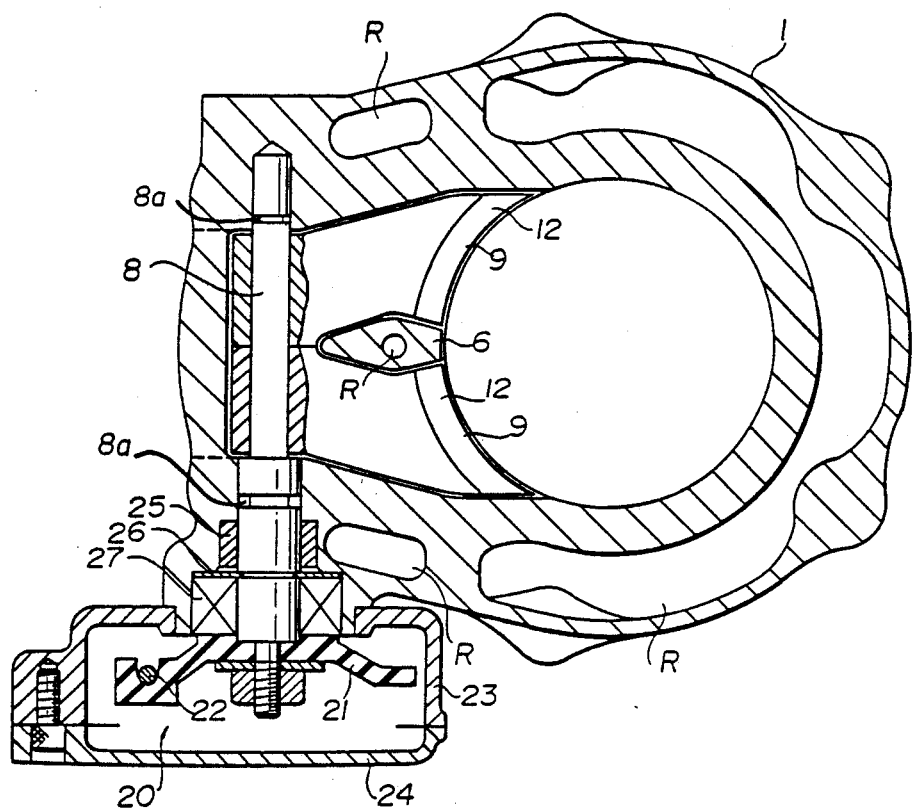
FIG. 2 is a cross-sectional plan view taken along line II—II of FIG. 1.
Figure 3:
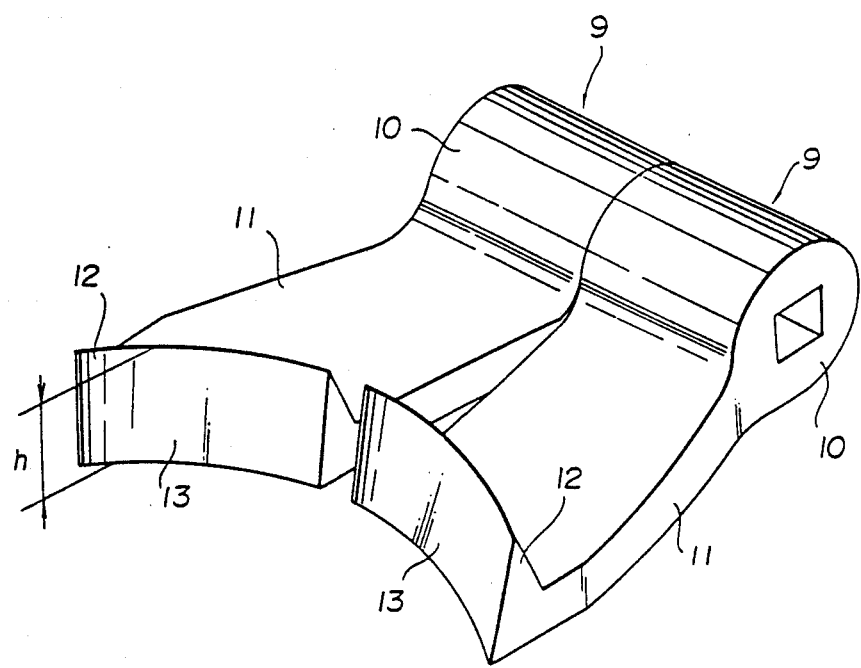
FIG. 3 is an oblique view of a valve mechanism of the present invention.
Figure 4:
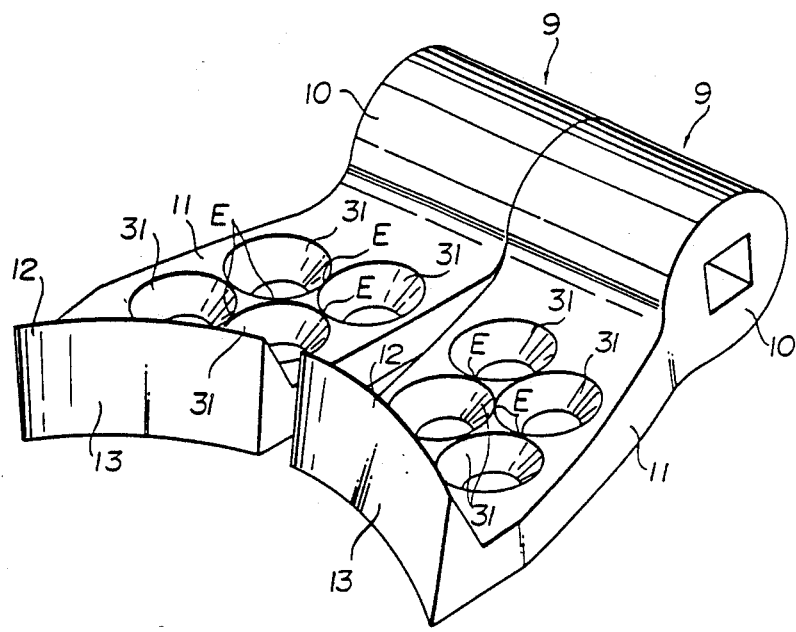
FIG. 4 is an oblique view of a second embodiment of valve mechanism of the present invention.

Turning in detail to the drawings, FIGS. 1 through 4 illustrate a first arrangement with FIG. 4 showing one modification to the valve mechanism. A cylinder block 1 of a two-cycle internal combustion engine is illustrated having a cylinder head 2, a piston 3 slidably fitted into the cylinder of the cylinder block 1 and scavanging paths and ports 4. Also arranged in the cylinder block is an exhaust passage 5 and exhaust port 5a. In the central portion of the exhaust passage 5 extending vertically is a web or reinforcing rib 6. This rib extends to the cylinder at the exhaust port 5a, dividing the port into two openings. The rib 6 acts to strengthen the area of the cylinder block around the exhaust passage and also acts to prevent the piston rings 34 from extending outwardly in a radial direction such that the rings interfere with the upper 5b and lower 5c edges of the exhaust port 5a.

A recess 7 is formed in an upper portion of the exhaust passage 5 arranged adjacent the port 5a. In the recess 7, a shaft 8 is rotably arranged in a plane perpendicular to the centerline of the cylinder. The shaft 8 has a rectangular cross section at the portion thereof traversing the exhaust passage to receive the valve body 9 that may be divided into separate mutually symmetrical elements disposed to either side of the rib 6.

The valve elements defining the valve body 9 may be best seen in FIG. 3. The shaft 8 extends through a shaft bearing portion 10. An essentially planar portion of plate 11 of relatively reduced thickness extends from the shaft bearing portion 10 toward the sidewall of the cylinder. At one end of the plate 11 is located an upwardly extending ridge 12. In this embodiment, a first, distal side of the upwardly extending ridge 12 is defined as a control surface 13 having a height h. The second or proximal side of the ridge 12 extends downwardly and away from the cylinder to meet with the plate portion 11. The control surface 13 is arranged to approximate a section of the cylinder wall in the area of the exhaust port. The recess 7 in the upper surface of the exhaust passage is arranged to follow the contour of the upper surface of the valve body 9. In cross section, the recess includes a triangular section 7a to accommodate the upwardly extending ridge 12. A flat portion 7b accommodates the plate portion 11 of the valve body 9 while another recessed portion 7c is arcuate in cross section to receive the shaft bearing portion 10 of the valve body 9.

The valve body elements are operated to be actuated in a pivotal manner by driving mechanism 20 through the shaft 8. The driving mechansim 20 includes a wire guide 21 attached to the shaft 8 which projects outwardly of the cylinder block 1. A motor (not shown) is connected to the wire guide 21 through a wire 22 which is controlled by a controller (not shown) for reversibly operating the motor in accordance with the rotational speed of the engine.

The portion of the shaft 8 which projects from the cylinder 1 and the wire guide 21 are arranged within a casing 23 attached to the cylinder block 1. A casing cover 24 is affixed to the outer side of the wire casing 23 to define a chamber for receipt of the driving mechanism 20. A bushing 25, a retainer 26 and a seal member 27 are arranged to pivotally support and seal the shaft 8. Ring grooves 8a are formed in the shaft 8 outside of the square portion receiving the elements of the valve body 9.

When the engine is rotated at low speed, the shaft 8 is rotated in the predetermined direction so as to cause the valve body 9 to swing downwardly to project into the exhaust passage 5. The control surface 13 then extends into the upper portion of the valve port 5a as can be seen in solid line in FIG. 1. The upper edge of the port 5a is lowered in effect by this rotation of the valve body by a distance L. As a result, the exhaust port 5a which is opened and closed by the reciprocation of the piston is opened later and closed earlier by the amount L by which the control surface 13 is lowered as described above.

In this condition, when the engine rotates at low speed, the exhaust port 5a is controlled such that the reflected pressure wave in the exhaust passage returns to the exhaust port 5a immediately before the exhaust port is closed and after the scavanging ports 4 are closed or closing. This results in more efficient charging of the combustion chamber at low speed.

Figure 1:
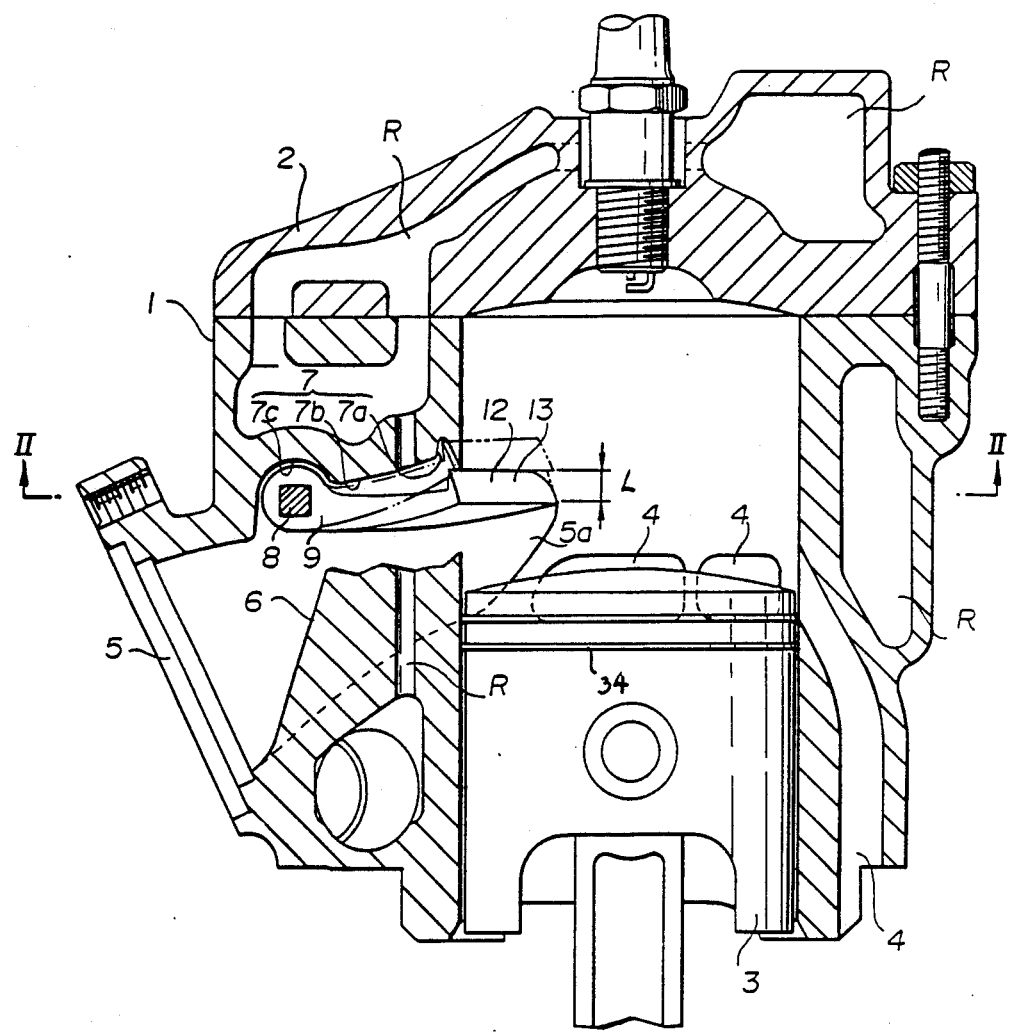
FIG. 1 is a cross-sectional elevation of a two-cycle engine employing the present invention.

When the engine has reached a high speed region, the valve body 9 is caused to swing in the opposite direction so as to be withdrawn into the recess 7 as shown by phantom lines in FIG. 1. Under this condition, the exhaust port 5a is opened early and closed later. The allows the reflected pressure wave to return to the exhaust port 5a immediately before the exhaust port is closed, again improving charging efficiency of the cylinder. Consequently, the exhaust port is better timed to accommodate a wider range of engine speeds. The control on the valve body 9 by the mechanism 20 may be accomplished by a continuously variable control system or a step system having two or more steps responsive to engine speed.

With the recess 7, the entire valve body may be withdrawn from the principal exhaust passage. This is advantageous as the maximum heat of exhaust gas is generally encountered at higher engines speeds. The upwardly extending ridge portion 12 defines a control surface 13 which allows substantial valve displacement into the passageway of the exhaust passage. Thus, a substantial degree of control can be achieved on the exhaust timing. At the same time, the plate portion 11 has a thinner wall. At low speeds when the valve body extends into the exhaust passage, temperatures are lower; and when temperatures are higher, at higher operating speeds, the valve body is retracted such that the thin wall plate portion 11 is protected from excessive thermal stress. The reduced thickness of the plate portion 11 helps to reduce the weight of the overall valve body, requiring less force to rapidly change position thereof. The increased size of the shaft bearing portion 0 is located where angular inertia is minimized. Consequently, this increased size does not significantly contribute to increased loading on the actuation mechanisms. In addition, it provides a stronger mounting mechanism for the valve body 9.

Looking specifically to FIG. 4, another embodiment of the valve mechanism is illustrated. In this embodiment, a plurality of holes 31 are formed in the planar portion 11 of the valve body 9. This arrangement allows flow from the recess portion of the mechanism. As the valve body 9 actuates, the edge portions E act to dislodge and break-up carbon deposits. These deposits may then pass through the holes 31 into the exhaust passage and then harmlessly from the engine. Thus this discharge of the carbon avoids the build-up thereof in the recess 7 such that the valve body 9 can continue to be closed up into the recess portion.

Figure 5:
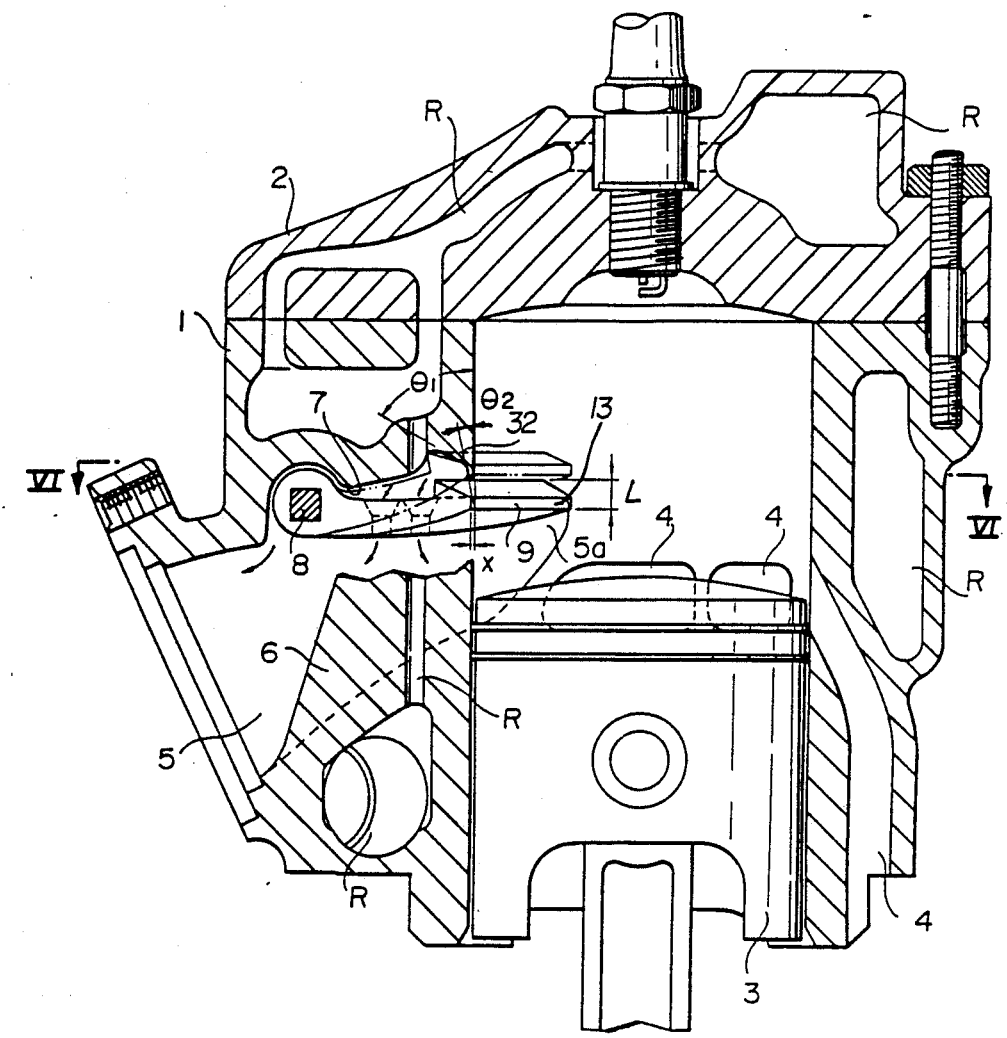
FIG. 5 is a cross-sectional elevation of a two-cycle engine employing another embodiment of the present invention.
Figure 6:
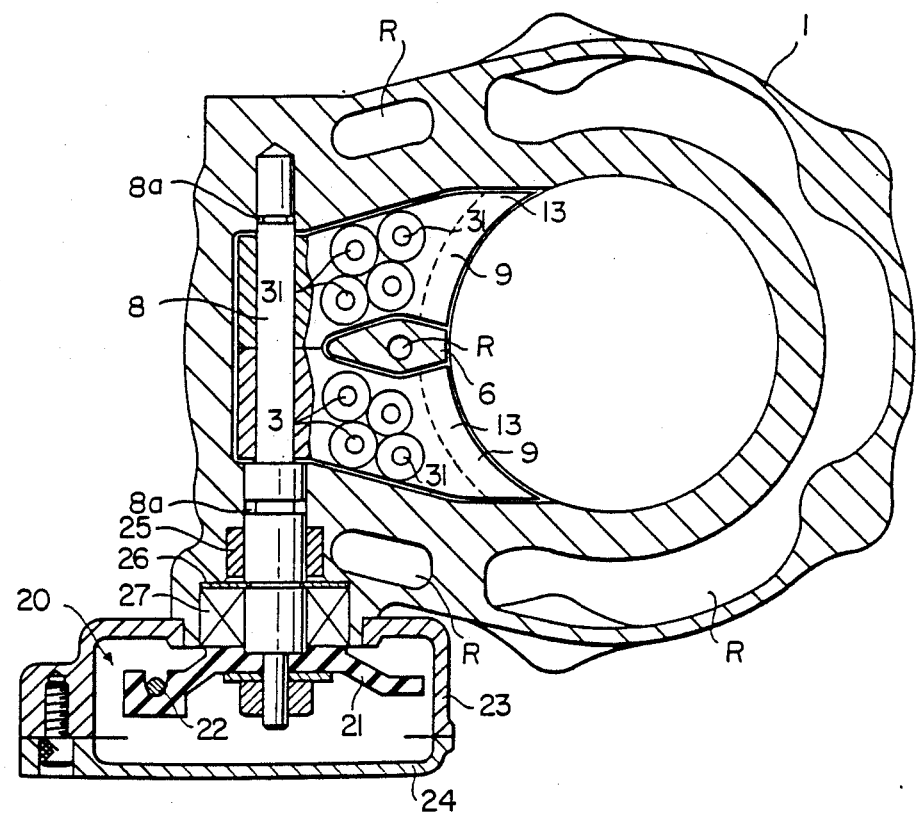
FIG. 6 is a cross-sectional plan view of the device of FIG. 5 taken along line VI—VI of FIG. 5.
Figure 7:
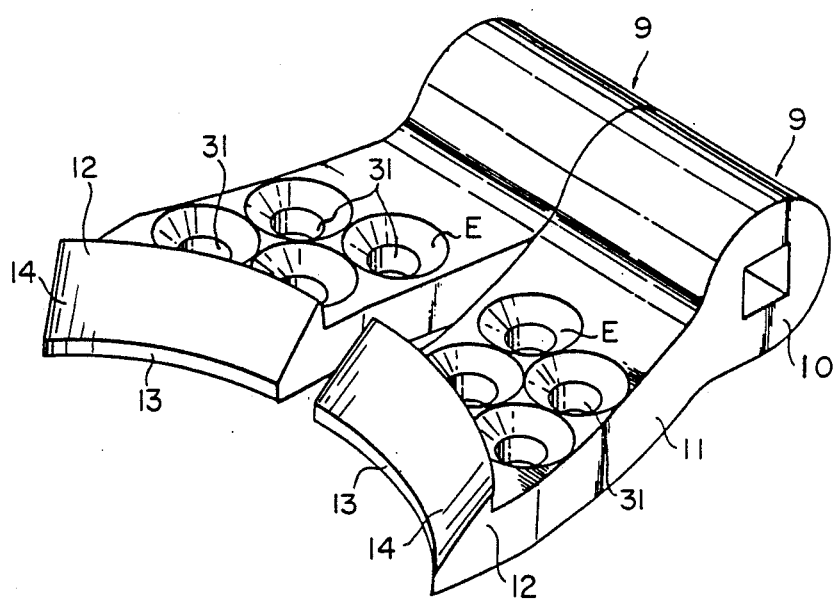
FIG. 7 is an oblique view of yet another valve mechanism of the present invention.
Figure 8:
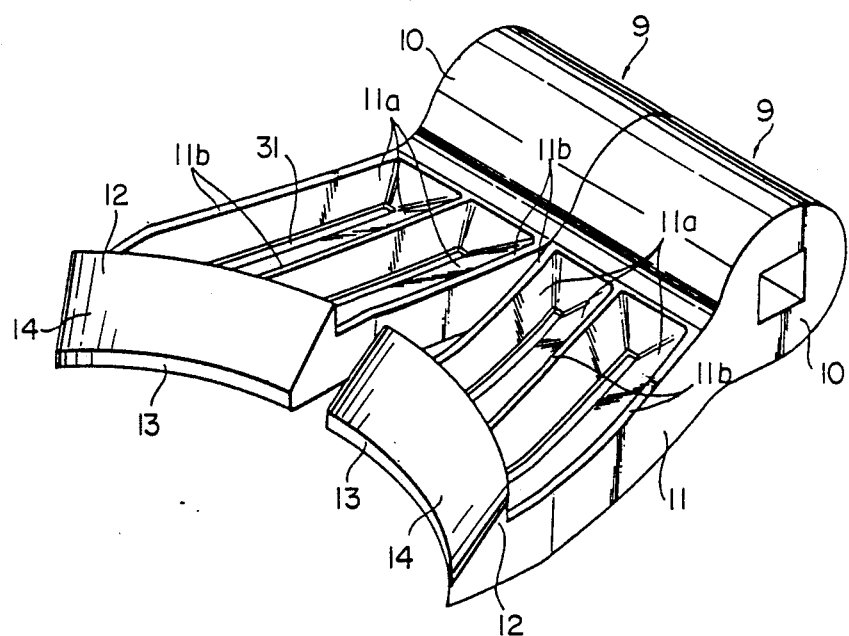
FIG. 8 is an oblique view of another embodiment of a valve mechanism of the present invention.
Figure 9:
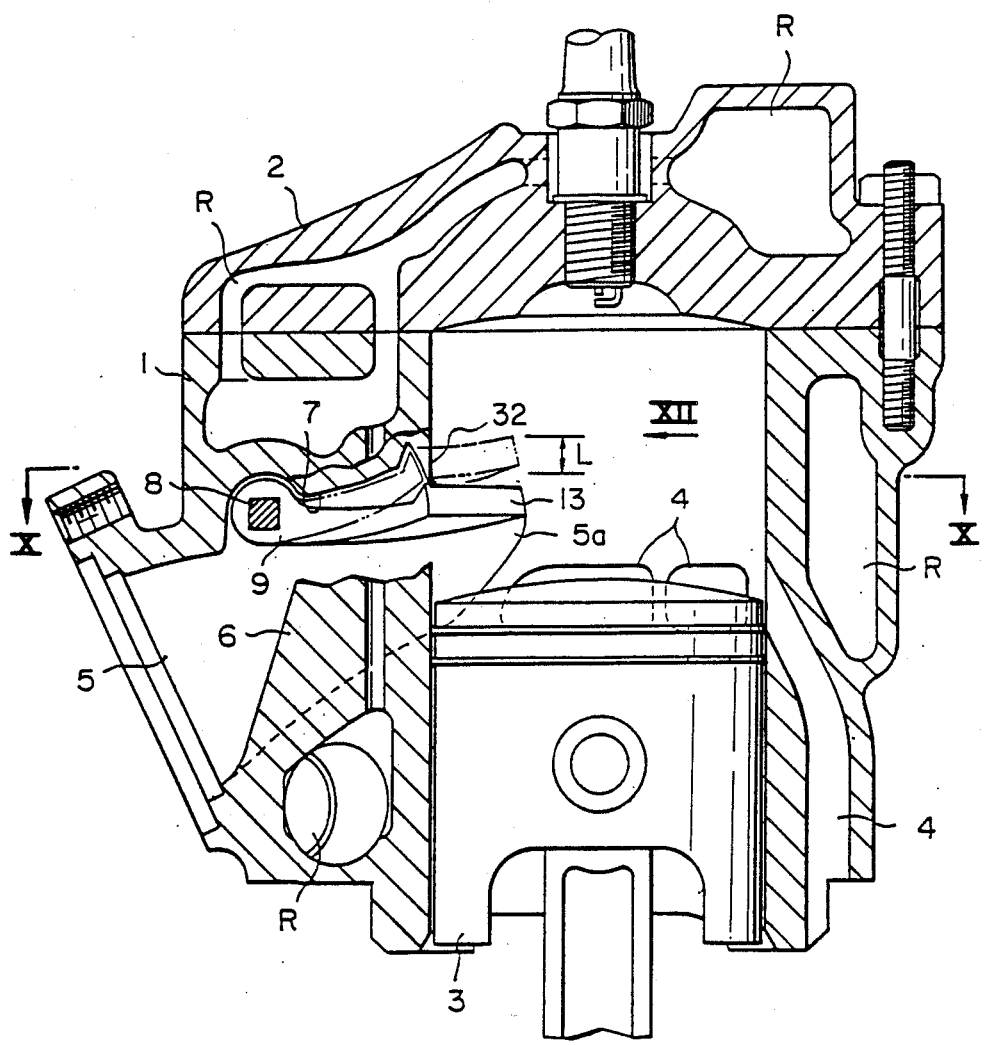
FIG. 9 is a cross-sectional elevation of a two-cycle engine employing another embodiment of the present invention.
Figure 10:
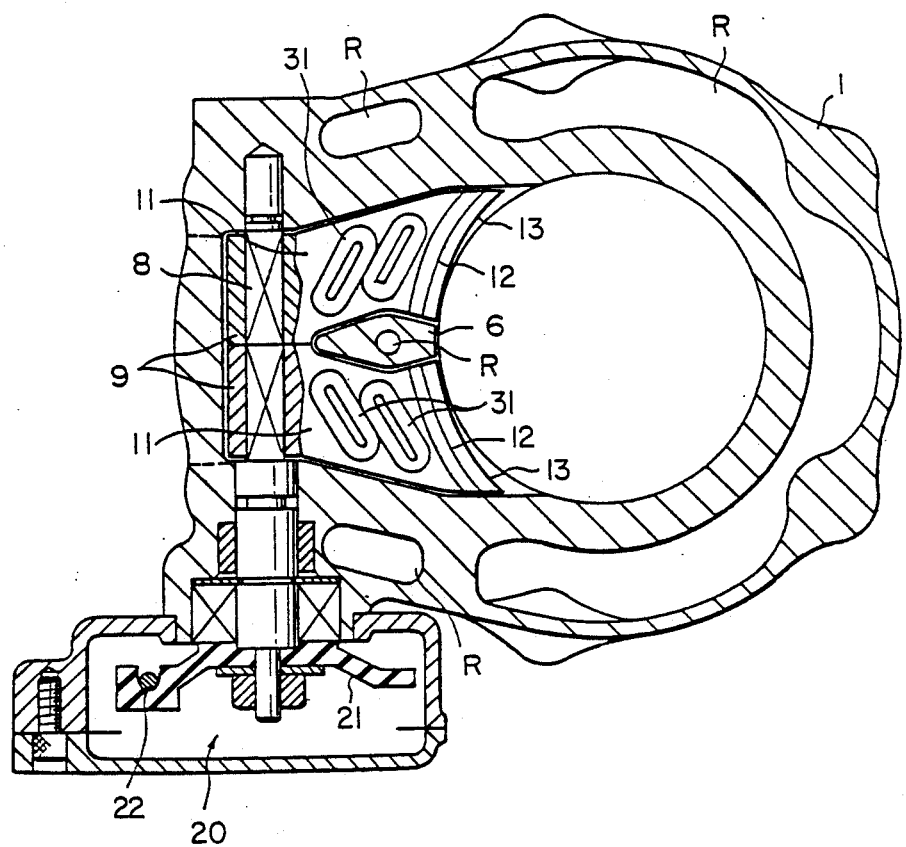
FIG. 10 is a cross-sectional plan view taken along line X—X of FIG. 9.
Figure 11:
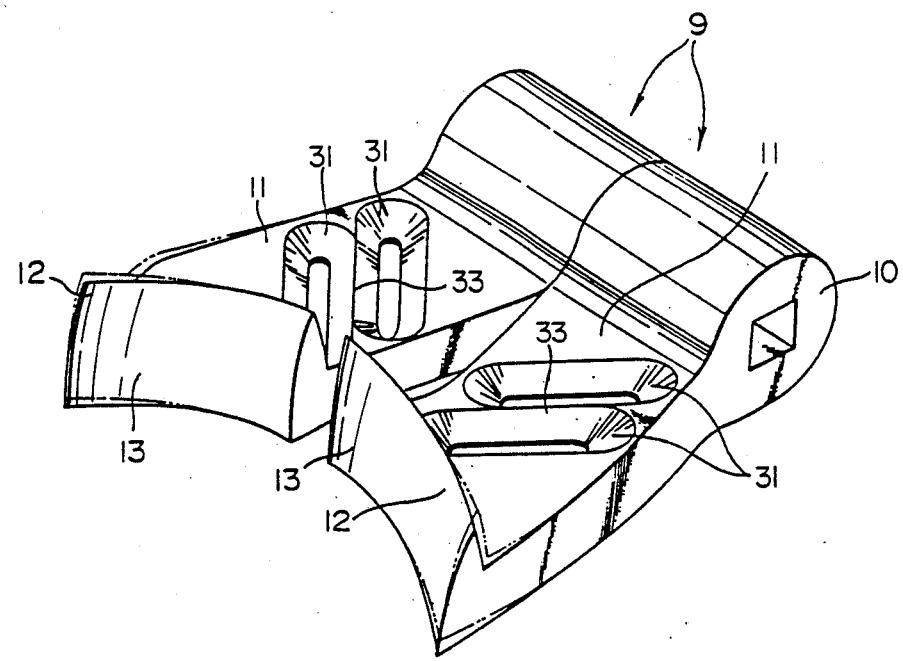
FIG. 11 is an oblique view of another valve mechanism of the present invention.

Referring next to the embodiment of FIGS. 5, 6 and 7 and the variation on the valve mechanism of FIG. 8, it should be noted that reference numbers on the figures on all of the embodiments correspond to identical or equivalent elements. Repetitive description of such elements is avoided. Attention is directed in this embodiment to the arrangement of the forward end of the valve body 9 in association with the exhaust port 5a and the sidewall of the cylinder. The control surface 13 of the valve body 9 is generally arranged such that it approximates a segment of the inner wall of the cylinder at the exhaust port area. The control surface 13 is displaced from the cylinder wall by a gap x as seen in FIG. 5. The upper surface of the valve body 9 and the surface of the recess 7 are arranged such that the recess conforms to the surface if the valve body with the valve body retracted into the recess. Thus, the shape of the upper portion of the valve body 9 impacts on the corresponding shape of the recess 7. This is of partricular interest at the portion immediately adjacent to the wall of the cylinder at the exhaust port 5a.

An upper edge is defined between the wall of the cylinder and the inner wall of the recess as it extends upwardly from the intake port 5a. This wall forms a relatively thin edge which, can be susceptible to damage from high temperature exhaust loads. This edge portion 32 defines an included angle $\theta_1$. This angle $\theta_1$ is arranged in the embodiment of FIG. 5 to be greater than the angle $\theta_2$. The angle $\theta_2$ is defined as a line between the sidewall surface of the cylinder and the continuation of the arc of movement of the upper edge of control surface 13 as it would be projected upwardly from the margin of the edge portion 32. This increased thickness accommodates more rapid heat transfer from the vulnerable edge forming the upper edge of the exhaust port 5a. This allows heat to be transferred through the water passages R from the engine.

Corresponding to this contour of the recess 7, the elements of the valve body 9 accommodates the widened edge 32. To this end, the upwardly extending ridge 12 includes a chamfered ridge surface 14 which is arranged contiguous with the controlling surface 13 and extends upwardly to the top of the ridge. The second surface then extends downwardly to the plate portion 11 of the valve body 9. The ridge surface 14 continues to cooperate with the control surface 13 to provide a full range of movement L while continuing to define an apparent upper surface of the valve porting 5a across the full distance L. It has been found that the fit between the valve body 9 and the sidewall of the cylinder at the exhaust port 6a can be compromised to some extent with the chamfered ridge surface 14 without reducing the ability of the overall mechanism to provide an adjustable apparent upper port edge on the exhaust port 5a. With the holes 31 and associated edge portions E, the flow coming through the gap between the edge 32 and the ridge surface 14 is accommodated and may act to draw carbon deposits through the holes 31 and harmlessly into the exhaust passage.

A substantial variety of designs may be employed for the plate portion 11. FIGS. 7 and 8 illustrate two such possible configurations. In FIG. 7, the holes 31 are shown to be circular in cross section with tapered edge portions E for accommodating and breaking-up carbon deposits. In FIG. 8, rectangular holes 31 are employed with tapered edge portions 11a and ridges 11b. Again, accommodation of some flow and entrained carbon is achieved as is the action of dislodging or breaking-up carbon through actuation of the valve body 9.

Looking next to the embodiment of FIGS. 9 through 12, attention is directed again to the area adjacent the exhaust port 5a. A naturally occurring relationship between the exhaust port 5a and the control surface 13 of the pivotally mounted valve body 9 when associated with a cylinder of circular cross section is that the effective angular movement of the valve body 9 is magnified by the distance from the pivoted axis of the valve body to the control surface 13. As can best be seen in FIG. 10, the outer ends of the control surface 13 are displaced from the pivot axis of the valve body 9 a greater distance than the center portion thereof. As the valve body 9 is pivoted upwardly into the recess 7, the end portions at the control surface 13 move a greater distance than the center portion.

The foregoing natural relationship between such components can be troublesome. A larger recess capacity may be required at the outer edges thereof t accommodate the increased swing. This can adversely affect the edge portion 32 in narrowing that portion with adverse consequences to heat transfer away from the exposed edge. The ends are also more quickly retracted upwardly which changes the relative timing on the exhaust port between the center position of the control surface 13 and the extremities thereof.

Figure 12:
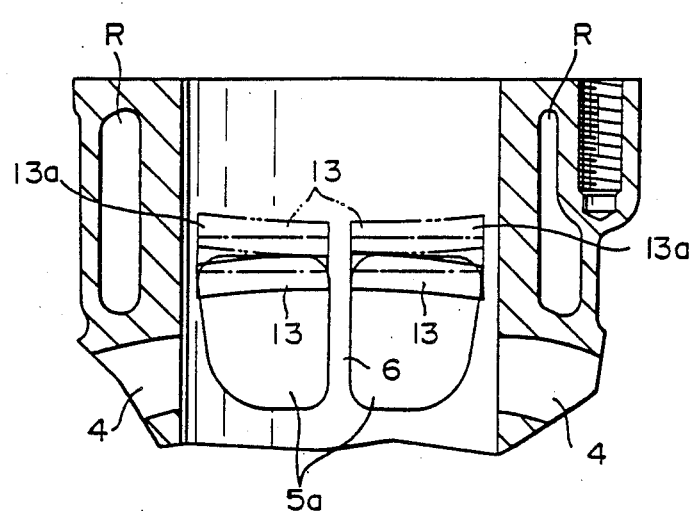
FIG. 12 is a detailed view taken in the direction of arrow XII of FIG. 9.

To accommodate the foregoing, the control surface 13 is shown in this embodiment to be curved so that the opposite ends thereof are curved downwardly from the center portion therof. Preferably, the curvature of the distal end of the valve body 9 is such that the lower edge of the control surface 13 is roughly horizontal relative to the axis of the cylinder when the valve body 9 is at a middle position between its closed and opened position, as shown in FIG. 12. This arrangement balances the ascent of the opposite ends of the control surface 13 with the descent thereof at the extreme positions.

With the valve body curved as described, the control surface 13 at its outer edges is lowered as compared with the center thereof. Thus, the outer ends do not extend as fully into the recess as with an uncurved valve body. Accordingly, the length of the projection 32 at the outer ends of the port 5a may be reduced in height. This reducs the length of the thermal path from the edge of the exhaust port 5a to an appropriate thermal sink. In addition, the edge portion 32 is structurally stronger.

As noted in prior embodiments, yet another arrangement for the hole 31 is illustrated. In this instance, a sharp edge line 33 is shown between the holes as a means for dislodging carbon deposits between the surface of the recess 7 and the top surface of the plate portion 11 of the valve body 9.

Figure 13:
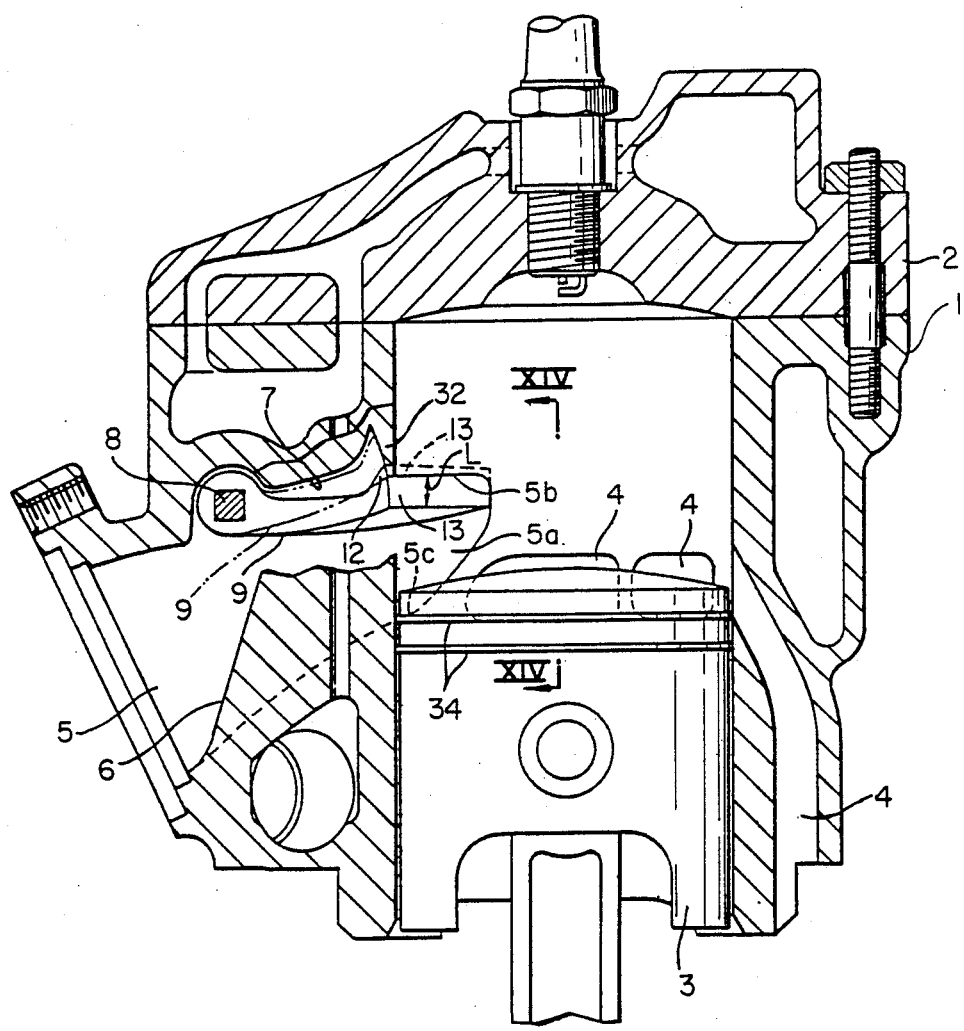
FIG. 13 is a cross-sectional elevation of yet another embodiment of the present invention.
Figure 14:
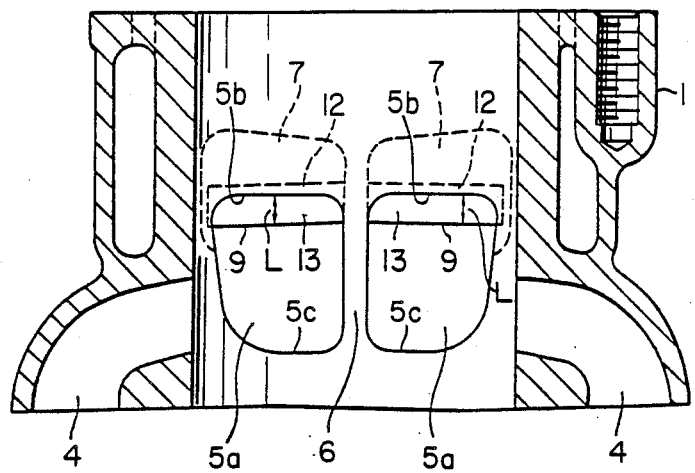
FIG. 14 is a detailed view of the device of FIG. 13 taken along line XIV—XIV of FIG. 13

Looking next to the embodiment of FIGS. 13 and 14, attention is again directed to the cooperation between the exhaust port 5a and the distal end of the valve body 9 at the control surface 13. In FIG. 13, the full extent of travel of the valve body 9 is illustrated with the extended position illustrated in full and the fully retracted position illustrated in phantom. The arrangement thus contemplates a range in timing height of L. With the valve body 9 fully extended, it can be seen that there remains an overlap between the downwardly depending edge 32 of the cylinder wall and the upwardly extending ridge 12. This overlap of the valve body 9 and the depending wall 32 of the cylinder is arranged such that the overlap exists in a projection of a plane perpendicular to the axis of the cylinder which is substantially the direction of the exhaust flow from the engine. The passage between these components thus creates a labyrinth seal acting to reduce the flow of gases into the recess 7. As a natural consequence to flow being reduced, less heat is transfereed into this area, less carbon forming material may also be introduced and the effectiveness of the apparent valve timing is not reduced.

Figure 15:
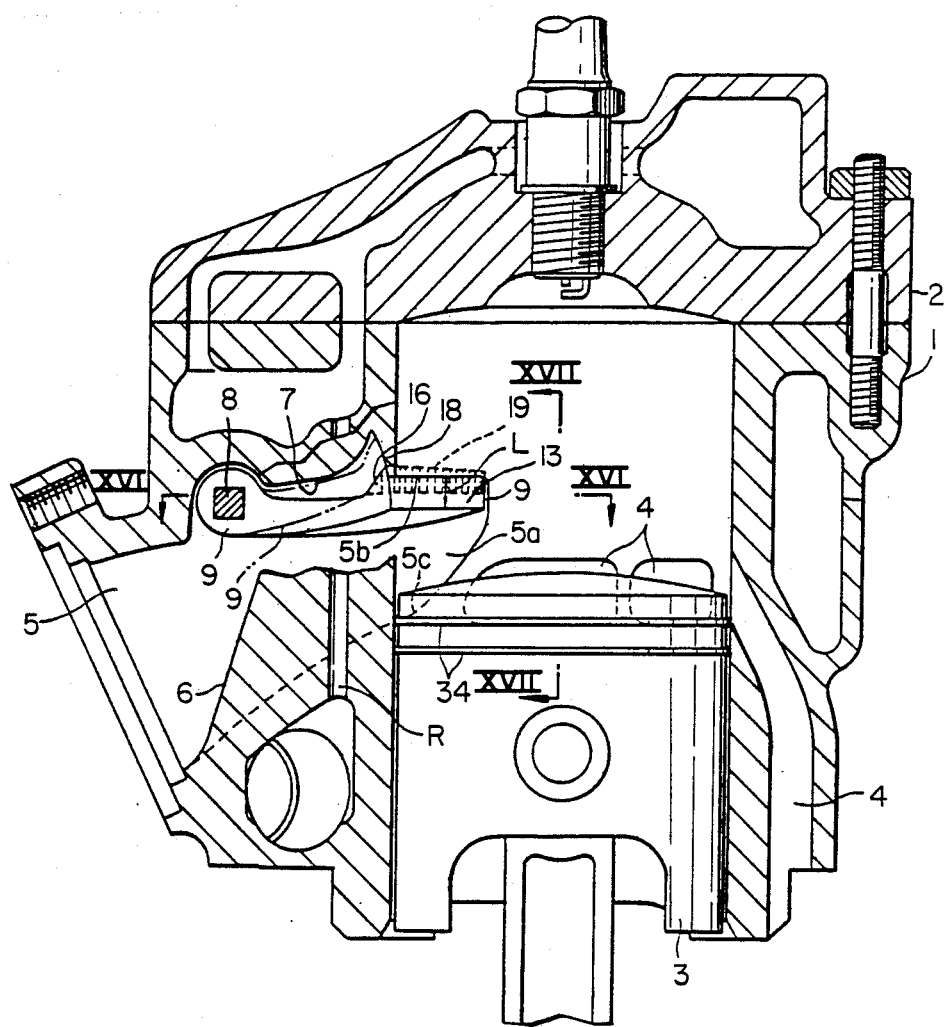
FIG. 15 is a cross-sectional elevation of a two-cycle engine employing another embodiment of the present invention.
Figure 16:
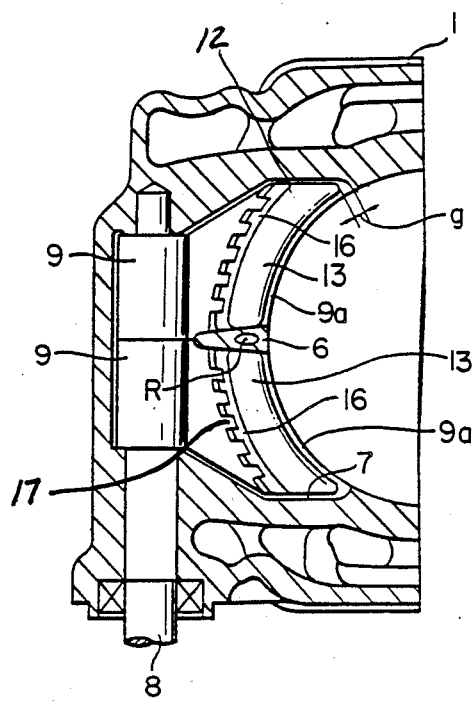
FIG. 16 is a detailed cross-sectional view taken along line XVI—XVI of FIG. 15.
Figure 17:
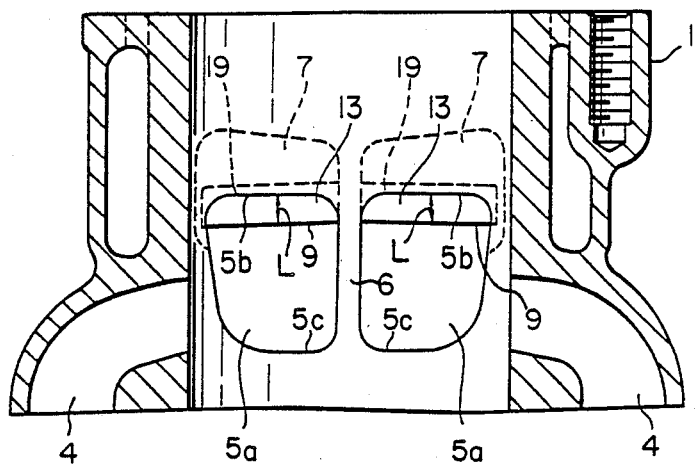
FIG. 17 is a cross-sectional view taken along line XVII—XVII of FIG. 15.

Turning then specifically to the embodiment of FIGS. 15, 16, and 17, a further feature is illustrated in the association between the exhaust port 5a and the valve body 9. Side recesses are defined within the recess 7 to accommodate a valve body 9 which is wider than the width of the exhaust port 5a. This relationship is possibly best illustrated in FIGS. 16 at the gap g. With the substantial swinging of the end portions of the valve body, the gap g in systems not incorporating side recesses is enlarged. This can result in the flow of exhaust gases resulting in delayed exhaust timing. With the side recesses and inwardly extending exhaust port margins, the gap g may be reduced, lessening the effect of the margins on timing. As shown in this embodiment, the ridge 12 is also shown to overlap at 19 across the top of the exhaust port 5a as well. The end surface of the ridge 12 facing the inside of the cylinder is serrated as at 16 to form the control surface 13. This defines a fine gap between the valve body and the inner surface of the cylinder in the recess 7 when the valve body 9 is swung to the closed position. The overlap 19 providihg the labyrinth seal may be selected so that it is approximately 1.5 mm at the narrowest portion thereof. The selection of an appropriate overlap is dependent on the desired height of the depending edge 32 which in turn tends to influence heat flow from the edge of the exhaust port 5a. By employing the overlap 19 and by structuring the outer recesses so as to reduce the gap g, significant leakage uncontrolled by the lower timing edge of the controlling surface 13 is reduced.

The serrated edge 16 on the ridge 12 is formed by providing a plurality of grooves 17 longitudinally spaced along the ridge. The grooves 17 may be U-shaped as shown in the drawing figures or, alternatively, they may be V-shaped and formed closed to each other.

By means of the serrated edge 16 carbon deposits that may accumulate in the triangular or deep portion 7a of recess 7 can be removed by virtue of the inertia force produced when the valve body 9 is pivoted into its stored position in the recess, whereby the so-formed teeth on the edge 16, when they impact on the accumulated carbon will crush and separate it from the surface of the recess portion 7a. Such crushing operation will occur when the thickness of the accumulated carbon exceeds the clearance space provided for the ridge 12 on the valve body 9 in the recess portion 7a. Therefore, since the recess portion 7a can be effectively kept free of accumulated carbon deposits, accurate performance of the exhaust timing control system of the invention can be maintained for extended periods.

Figure 18:
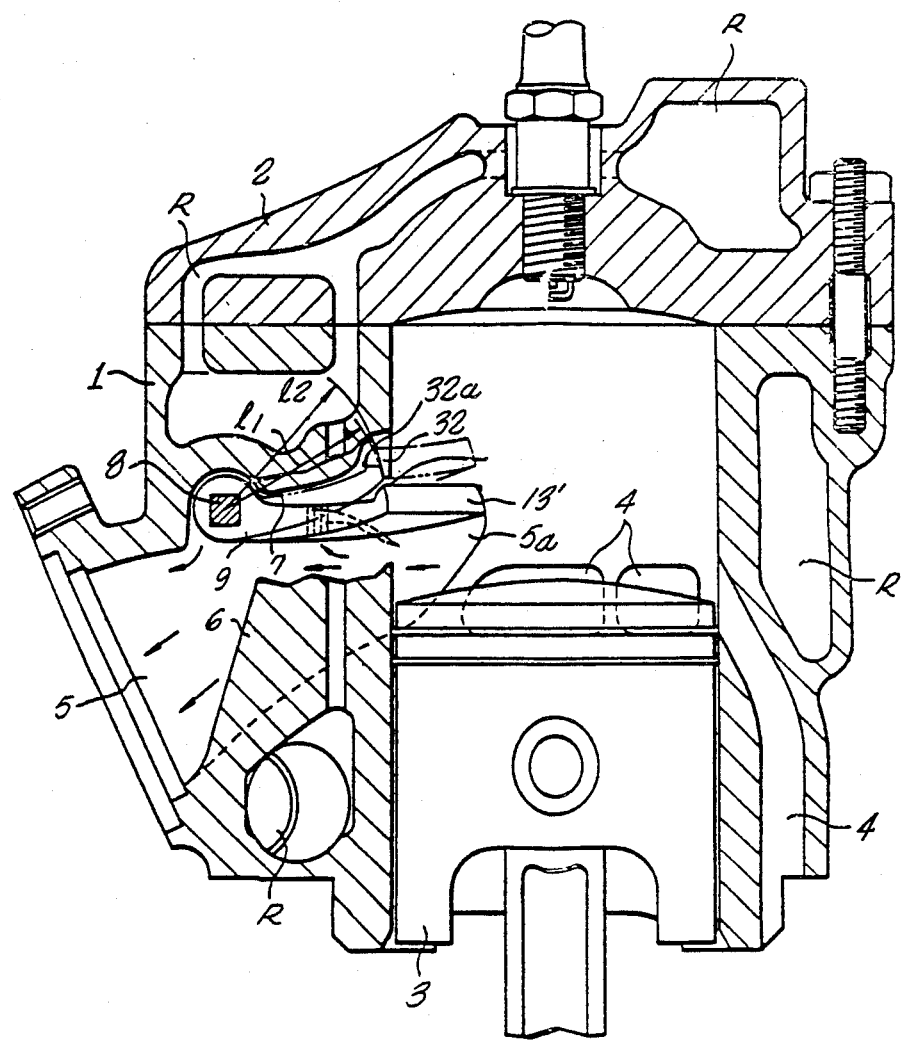
FIG. 18 is a cross-sectional elevation of a two-cycle engine employing another embodiment of the present invention.
Figure 19:
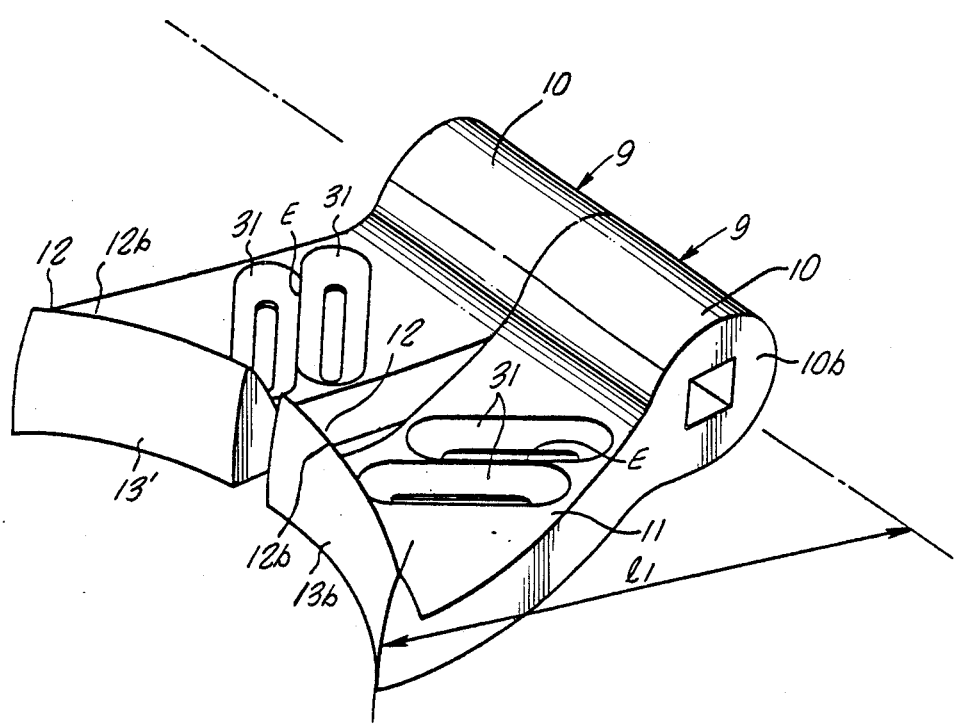
FIG. 19 an oblique view of the valve body of FIG. 18.

The present invention contemplates, in a further embodiment, means to prevent carbon from depositing on the surface of the recess 7 and, particularly, in the portion 7a defined by the inner surface of the downwardly depending edge 32 of the cylinder wall. In this embodiment, best illustrated in FIGS. 18 and 19, the upwardly extending ridge 12 of the valve body 9 is provided with a control surface 13' that is arcuate in a plane parallel with the cylinder axis. The center of curvature of the surface 13' is in line with the center of swing of the valve body 9 defined by the axis of the shaft 8. The depending edge 32 is similarly provided with an interior surface 32a that is arcuate in a plane parallel with the cylinder axis and whose center of curvature is in line with the center of swing of the valve body 9.

Advantageously, although the control surface 13' is arranged in closely spaced relation to the interior surface 32a of edge 32, the radius of curvature $l_2$ of the latter is slightly greater in value than that, $l$, of the former.

In the exhaust timing control system of this embodiment, since the free end of the valve body 9 containing control surface 13' and the interior surface 32a of the edge 32 are formed so that their sections, when cut by a plane parallel to the cylinder axis, are arcs whose centers of curvature are in line with the center of swing of the valve body 9, clearance between the cooperating surfaces on the respective members can be minimized. Moreover, any carbon deposits that may accumulate in the clearance space can be scraped off by the sharp upper edge 12b of the ridge 12 containing control surface 13' when the valve body 9 is pivoted into the recess 7. The removed carbon deposits ar exhausted to the exhaust passage 5 by means of the flowing exhaust gas.

Preferably the valve body 9 of this embodiment is provided with through-holes 31 to assist in the exhaust of the removed carbon deposits and to enable the introduction of blow-by gas or exhaust gas to the upper side of the valve body 9 in order to clean the upper surface of the valve body and the facing surface of the recess 7 thereby to prevent the accumulation of carbon deposits on these surfaces.

Figure 20:
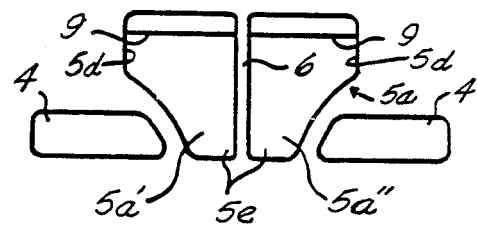
FIG. 20 is an essentially schematic representation illustrating one contemplated relationship between the exhaust ports and scavanging ports of an engine constructed according to the present invention.
Figure 21:
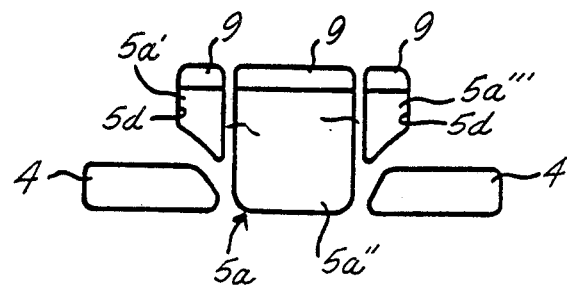
FIG. 21 is an essentially schematic representation similar to FIG. 20 illustrating another possible relationship between the exhaust ports and scavanging ports of an engine constructed according to the present invention.
Figure 22:
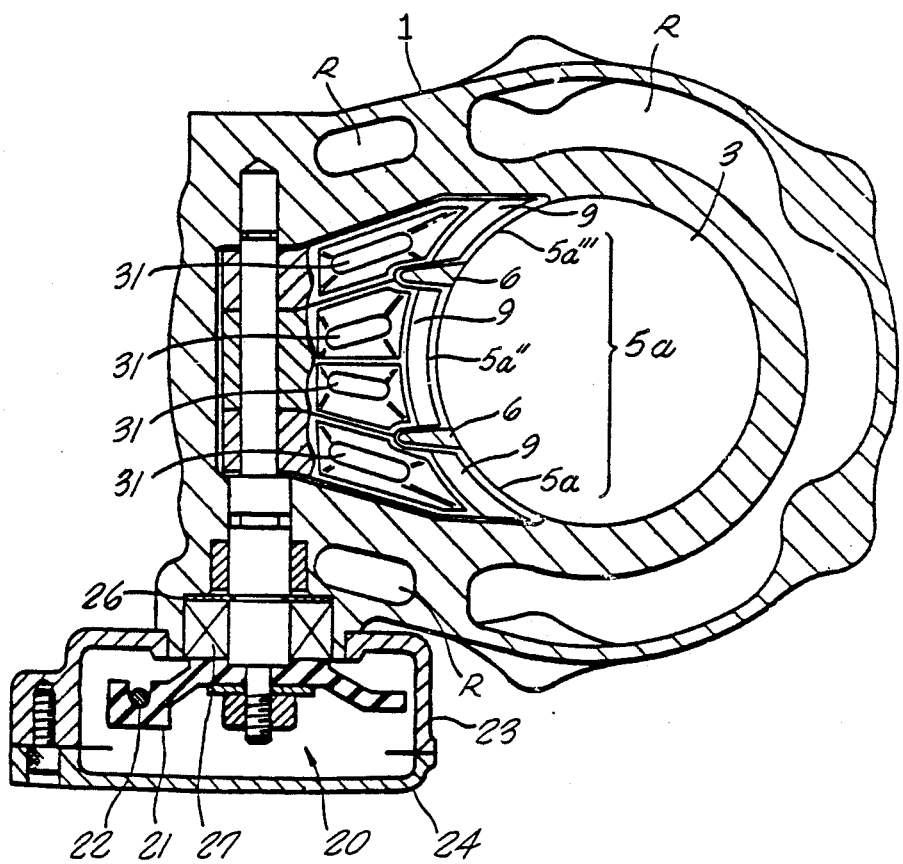
FIG. 22 is a cross-sectional view of a two-cycle engine having exhaust ports arranged in accordance with the embodiment of invention as illustrated in FIG. 21.

As shown in the respective drawing figures and with particular reference to FIGS. 20 to 22, the present invention contempates the formation of the exhaust port 5a as plural openings separated by a rib 6. By structuring the exhaust port 5a in this manner the port and the associated exhaust passage 5 can be designed with a greater flow area to increase the output capabilities of the engine without interfering with the slidability of the piston rings 34 which heretofore had limited the ability to expand the exhaust passage flow area in such engines. To accomplish this, the exhaust port 5a of the present invention is divided by one or more ribs 6 into a plurality of openings disposed side-by-side about the periphery of the cylinder. The valve body 9, moreover is divided into a number of sections corresponding to the number of openings that form the exhaust port 5a. These sections are are provided adjacent their free ends with a clearance space to accommodate relative movement between the sections and the ribs 6.

As shown in FIG. 20 the exhaust port 5a of exhaust passage 5 is divided into two openings 5a' and 5a" by the rib 6 that extends in the axial direction of the cylinder. The flow area presented by the two openings can be designed to be greater than that presented by a single, conventional exhaust port opening. This is permitted by the fact that the rib 6 is formed integrally with the cylinder block 1 in such manner that, as shown in FIG. 2, its inner periphery corresponds with the inner peripheral surface of the cylinder. The rib 6, therefore, not only reinforces the exhaust port but also prevents the piston rings 34 attached to the piston 3 from expanding radially outwardly where they might otherwise contact the upper and lower edges of the exhaust port thereby interfering with the sliding movement of the rings. The rib 6 may be solid as shown in FIG. 22 or may be provided with a cooling passage forming part of the cylinder block cooling system R as shown in FIG. 1.

To accommodate the rib 6 the valve body 9 is, as aforementioned, preferably separated into individual parts that are symmetrical with respect to each other and that are each adapted to operate in the respective openings 5a' and 5a" forming the exhaust port 5a. The shaft bearing portions 10 of the respective parts of the valve body 9 are maintained in contiguous relation on the shaft 8, but are separated from one another adjacent their free ends, with the rib 6 being disposed therebetween. In order to permit free movement of the parts of the valve body 9 with respect to internal surface of the cylinder and the rib 6 a clearance space is provided about the entire periphery of the valve body. The clearance space is designed to accommodate relative thermal expansion of the respective system members in order to prevent interfrence with the relative movement required therebetween. . In FIGS. 21 and 22 is illustrated another embodiment of the invention in which the exhaust port 5a is divided into three openings 5a', 5a" and 5a''' by intermediate ribs 6. The valve body 9 for this embodiment is similarly divided as shown in FIG. 22 into three parts in which each part is designed to accommodate movement with respect to the ribs 6 and to operate in each of the respective openings 5a', 5a" and 5a'''. This embodiment illustrates that the flow area of the exhaust port 5a can be further extended from that contemplated by the previous embodiment. Moreover, in this embodiment, because of the absence of a rib in the middle of the exhaust port 5a where the quantity and velocity of gas flow is greatest, gas flow resistance is advantageously reduced as compared with the previous embodiment.

As indicated in the respective drawing figures and particularly in FIGS. 20 and 21 the invention contemplates locating the opening defining the exhaust port 5a vertically above the respective scavanging ports 4. This is in order to permit design of exhaust port openings of extended width in order to increase the amount of available flow area provided thereby without interference from the scavanging ports 4. Accordingly, those side edges, indicated as 5d in the respective figures, adjacent the top dead center end of the piston stroke are positioned above the scavanging ports 4.

By designing the system in this manner, the locational relationship between the lower portion of the exhaust port openings, indicated as 5e, adjacent the bottom dead center and of the piston stroke can be maintained adjacent the scavanging ports 4, yet the effective flow area provided by the exhaust port 5a can still be greatly expanded without interference by the scavanging ports thereby improving the output characteristics of the engine.

Design of the exhaust ports in this manner further enables expansion of the available flow area provided by the exhaust port without effect on the exhaust timing control system of the invention. Therefore, the ultimate result of these conjoint features is a compounded improvement in the engine output characteristic over a wider range of revolutions from the low revolution range to the high revolution range.

Reference to FIG. 21, where the exhaust port 5ais defined by three openings 5a', 5a" and 5a" separated by the intermediate ribs 6, indicates that the beneficial result obtainable by practice of the aforementioned teaching is equally available to an exhaust port comprised of three openings.

It has been determined that in each of the previously described embodiments of the timing control system of the present invention some difficulty may be encountered in the assembly operation to insure that a predetermined clearance is provided about the entire periphery of the parts of the valve body 9 and the adjacent surfaces of the ribs 6 and the exhaust passsage 5. This need necessitates accurately locating the valve body parts by shifting them along the shaft 8 after assembly in order that the valve body 9 can swing freely without hitting the adjacent wall surfaces even in a thermally expanded condition. Because of the small clearance provided between the respective elements of the system, the assembly operation required for the aforementioned system embodiment requires delicate manipulation of the respective system components. When it is considered that the operation is performed visually by a worker, it will be appreciated that the assembly operation requires excessive time and labor making mass production of the system difficult.

Figure 23:
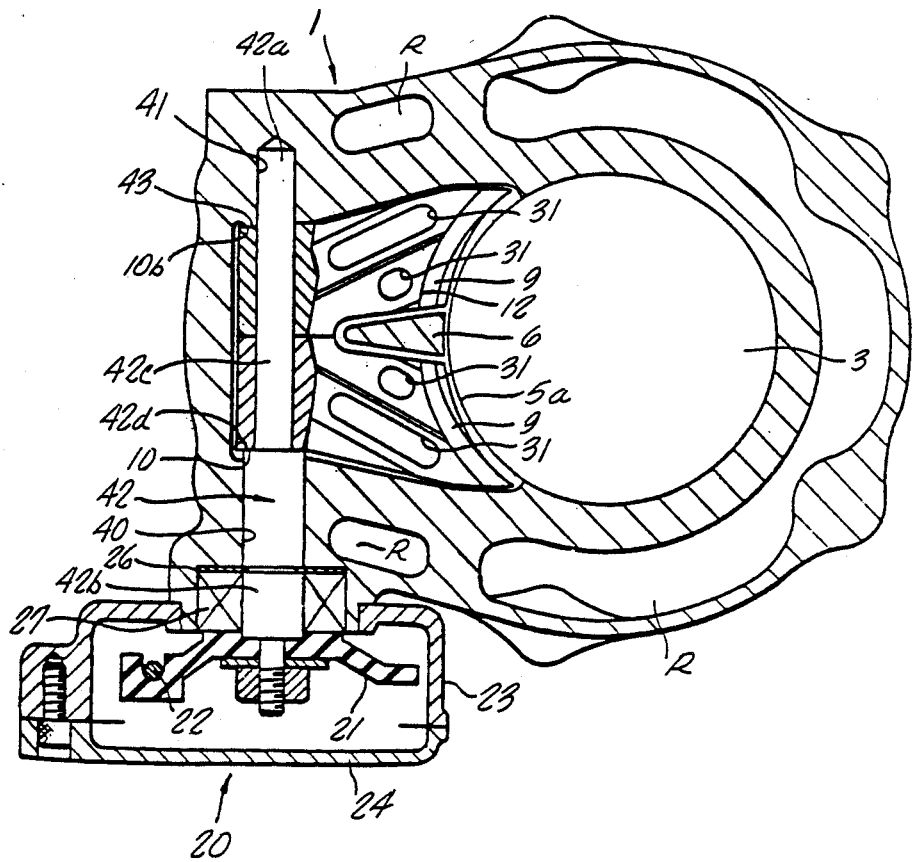
FIG. 23 is a cross-sectional view similar to FIG. 2 illustrating a valve body-mounting arrangement of the present invention.
Figure 24:
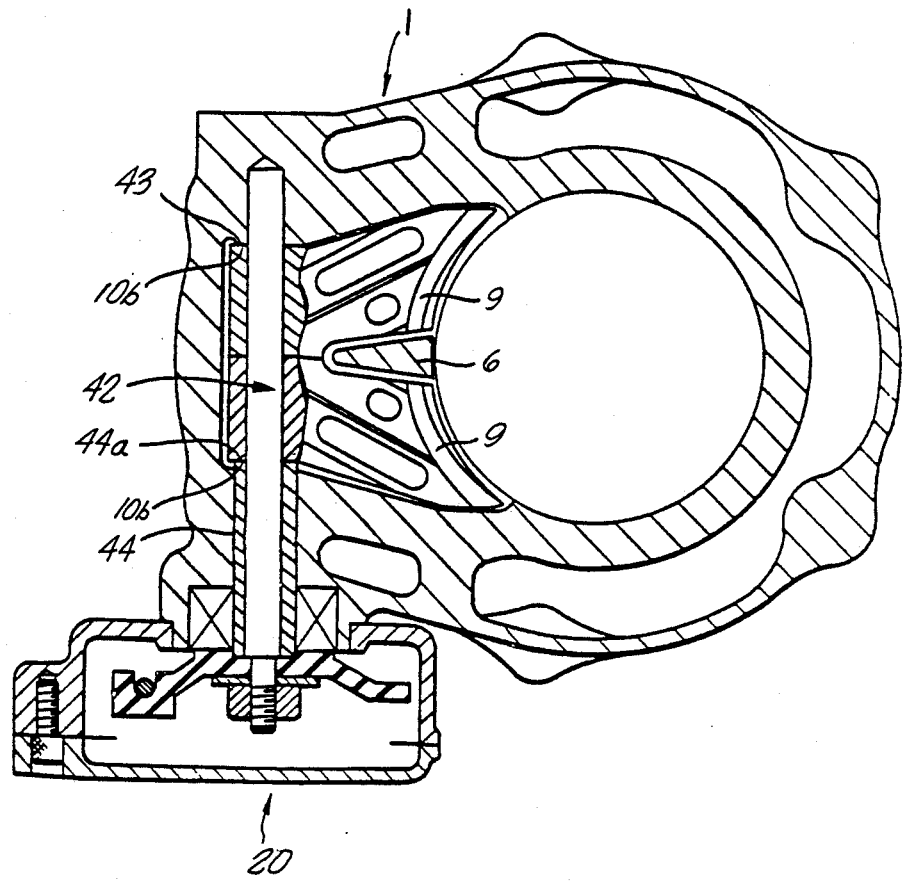
FIG. 24 is a cross-sectional view similar to FIG. 23 illustrating another embodiment of a valve body-mounting arrangement of the present invention.

Accordingly, this problem is avoided by the embodiment of the invention illustrated in FIGS. 23 and 24 in which the valve body pivot mount provided by the shaft 8 is altered. In the embodiment of FIG. 24, as in the previously described embodiments, in the upper part of the exhaust passage 5 somewhat downstream of the exhaust port 5a. Across the recess 7 for reception of the valve body 9 is formed. Through the recess 7 is formed a shaft insertion hole, comprised of portions 40, 41, extending in the direction transverse the cylinder centerline. The shaft insertion hole formed by portions 40, 41 is provided from one of the outer sides of the cylinder block 1, passing through the side wall on one side of the exhaust passage 5, with the end, indicated as portion 41, reaching the inside of the side wall on the other side of the passage 5. The shaft hole- portion 40 is a through hole that is larger in diameter than end portion 41. Machining of the shaft insertion hole is made by drilling the end hole portion 41 first, then drilling the through hole portion 40.

Extending into the shaft insertion hole, machined as described, is a shaft 42. This shaft 42 is unlike the shaft 8 previously described in that, while it possesses an end portion 42a that is smaller in diameter, a base portion 42b larger in diameter and a middle portion 42c square shape in section, the end face of the step portion between the valve body mounting portion 42c and base portion 42b is finished to be a position control face 42d.

When the end portion 42a of shaft 42 is inserted into the end hole section 41 of the shaft insertion hole, the base portion 42b of the shaft is located in the through hole section 40, and the valve body mounting portion 42c, at the middle, is located in the recess cavity 7, the shaft 42 is rotatably supported. To the valve body mounting portion 42c of the shaft 42, set as described, are fixedly fitted the parts of valve body 9. These parts are symmetrical to each other for exhaust timing control, and spaced at their free ends so as to accommodate the rib 6 therebetween.

The length of the shaft mounting portion 42c mounting the two parts of the valve body 9 is made slightly smaller than the inside width of the cavity 7 corresponding thereto.

Axial end faces 10b of the shaft receiving portion 10 of the parts of valve body 9 are finished to be flat faces normal to the shaft 42. These faces 10b are rotatably held between a valve body position control face 43 formed on the inner side of the cavity 7 of the exhaust passage 5 and the other valve body position control face 42d formed on the step portion end face of the shaft 42, whereby the parts of the valve body 9 are positioned axially of the shaft. In this positionally controlled condition, the peripheral edges of the valve body parts, excluding said end faces 10b, are thereby provided with the requisite clearance with respect to the surface of the exhaust passage 5 and rib or ribs 6.

The position control face 43 shown in the drawing is a circular face that projects slightly from the inside wall of the cavity 7 and is concentric with the shaft 42. This valve body position control face 43 is machined as follows: firstly, after casting of the cylinder block 1, when the cavity 7 is formed, on the concerned side of the cavity 7 is formed a circular projected portion of smaller diameter than the through hole section 40 of the shaft insertion hole. Then, when the through hole section 40 of the shaft insertion hole is machined, simultaneously or after that, a cutting tool is inserted from the inlet of the shaft insertion hole to finish the top surface of the circular projected portion for forming the control face 43.

To the base portion 42b of said shaft 42 is mounted a cotter 20 for location purposes. The cotter 20 is fixed by being held between the outside surface of the cylinder block 1 and sealing material 21 mounted thereon, whereby the shaft 42 is accurately positioned in the thrust direction.

Accordingly, in the exhaust timing control system constructed according to this embodiment of the invention, simply by fitting the parts of the valve body 9 into the cavity 7 formed in the exhaust passage 5 and passing the shaft 42 therethrough on assembly, the parts of valve body 9 are held between the valve body position control face 43 in the exhaust passage 5 and the valve body postion control face 42d on the step portion end face of the shaft 42, and is automatically located with respect to its position in the thrust direction. Moreover, the position control face 43 is formed by a cutting process after molding of the cylinder block, so that its dimensional accuracy is enhanced. Therefore, in an engine timing control system constructed according to this embodiment, it is not necessary to perform the aforementioned valve body locating operation that requires so much time after once having passed the shaft 8 through the parts of the valve body 9 as was done in the past. Thus, this embodiment has the advantage that the component elements of the control system can be assembled easily for the facilitation of mass production.

Alternatively, the valve body position control arrangement may be arranged as shownin FIG. 24, where, into the through hole section 40 of the shaft insertion hole, is press-fit a collar 44 that is accurate in its axial dimension between the two ends. The end of the collar 44, indicated as valve body position control face 44a, is held against the end face 10b of the adjacent shaft mounting portion 10 of the valve body 9. This embodiment has the advantage that the need to accurately machine the shoulder 42d on shaft 42 can be avoided.

Thus, improved exhaust timing control devices have been disclosed. These devices act to minimize weight, reduce the effect of heat and provide sealing for the reduction in carbon deposits. A more effective exhaust timing control apparatus may, therefore be realized. While embodiments in applications of this invention have been shown and described, it would be apparent to those skilled in the art that many more modifications are possible without departing from the inventive concepts here. The invention, therefore, is not to be restricted except in the spirit of the appended claims.

What is claimed is:

1. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending toward the exhaust port from said shaft bearing portion and a ridge upwardly extending from said plate at one end thereof adjacent said control surface, the exhaust passage having a recess in the upper surface thereof to receive said valve body, said recess extending upwardly adjacent the exhaust port to receive said upwardly extending ridge, said control surface and said upwardly extending recess surface are formed as arcs in a plane parallel with the axis of said cylinder with said arcs being concentric with said pivot axis.

2. The exhaust timing control apparatus of claim 1 wherein the radius of curvature of said control surface is less than that of said upwardly extending recess surface.

3. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port, said valve body having a shaft bearing portion about said pivot axis, a plate extending toward the exhaust port from said shaft bearing portion and a ridge upwardly extending from said plate at one end thereof adjacent control surface, the exhaust passage having a recess in the upper surface thereof to receive said valve body, said recess extending upwardly adjacent the exhaust port to receive said upwardly extending ridge, with said control surface and said upwardly extending recess surface in mutually closely spaced disposition and the edge of said ridge serrated for removal of carbon deposits in the space between said surfaces.

4. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending toward the exhaust port from said shaft bearing portion and a ridge upwardly extending from said plate at one end thereof adjacent said control surface, said cylinder including a plurality of openings defining said exhaust port and rib means integral with said cylinder extending parallel to the axis thereof interposed between said openings, said valve body at said one end containing control surfaces operable each in its respective opening, and said control surfaces being mutually laterally spaced to accommodate relative movement between said valve body and said rib means.

5. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending toward the exhaust port from said shaft bearing portion and a ridge upwardly extending from said plate at one end thereof adjacent said control surface, the exhaust passage having a recess in the upper surface thereof to receive said valve body, said recess extending upwardly adjacent the exhaust port to receive said upwardly extending ridge, said control surface and said upwardly extending recess surface formed as arcs in a plane parallel to the axis of said cylinder.

6. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending toward the exhaust port from said shaft bearing portion and a ridge upwardly extending from said plate at one end thereof adjacent said control surface, said cylinder having a plurality of openings therein defining said exhaust port and rib means integral with said cylinder extending parallel to the axis thereof interposed between said openings.

7. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending across substantially the entire exhaust passage and toward the exhaust port from said shaft bearing portion and a ridge upwardly extending from said plate at one end thereof adjacent said control surface, said engine cylinder further including scavanging ports and said exhaust port containing opposed side edges along which said valve body is movable, said side edges being disposed vertically above said scavenging ports.

8. An exhaust timing control apparatus for a two-cycle engine cylinder having an exhaust port and passage extending from the side wall of the cylinder, comprising:

a valve body pivotally mounted about a pivot axis in the exhaust passage and extending to a control surface at the exhaust port to define an apparent upper timing edge of the exhaust port, said valve body having a shaft bearing portion about said pivot axis, a plate extending across substantially the entire exhaust passage and toward the exhaust port from said shaft bearing portion and a ridge upwardly extending from said plate at one end thereof adjacent said control surface;

means for positioning said valve body with respect to said exhaust port and passage, said means comprising:

a pivot shaft defining said pivot axis extending transversely of said exhaust passage and being mounted for pivotal movement in the side walls thereof, means for forming a bearing surface projecting from one of said side walls defining a position control face, means on said pivot shaft axially spaced from the other of said side walls forming a shoulder disposed in facing relation to said position control face;

said pivot shaft extending through said shaft bearing portion of said valve body to secure said valve body for pivotal movement with said pivot shaft; and connection means for securing said pivot shaft to said cylinder whereby the axial ends of said valve body are drawn into engagement with said pivot shaft shoulder and said side wall bearing surface respectively.

9. The exhaust timing control apparatus of claim 8 in which said shoulder is integrally formed on said pivot shaft.

10. The exhaust timing control apparatus of claim 8 in which said pivot shaft includes an elongated collar press fit thereon, the end of said collar being axially spaced from the end of said shaft to form said shoulder.

* * * * *

UNITED STATES PATENT AND TRADEMARK OFFICE
CERTIFICATE OF CORRECTION

PATENT NO. : 4,903,647
DATED : February 27, 1990
INVENTOR(S) : Hitoshi YAMAMOto et al.

It is certified that error appears in the above-identified patent and that said Letters Patent is hereby corrected as shown below:

In claim 3 (column 13, line 21) after "the" insert -- exhaust port to define an apparent upper timing edge of the --.

Signed and Sealed this

Sixth Day of August, 1991

*Attest:*

HARRY F. MANBECK, JR.

*Attesting Officer*     *Commissioner of Patents and Trademarks*